United States Patent
Li et al.

(10) Patent No.: US 12,390,791 B2
(45) Date of Patent: Aug. 19, 2025

(54) DESALINATION OF HIGH CHLORIDE SALT ABSORBED POROUS BEADS

(71) Applicant: KNAUF GIPS KG, Iphofen (DE)

(72) Inventors: Qinghua Li, Rolling Meadows, IL (US); Xiaoyan Chen, Austin, TX (US)

(73) Assignee: KNAUF GIPS KG, Iphofen (DE)

( * ) Notice: Subject to any disclaimer, the term of this patent is extended or adjusted under 35 U.S.C. 154(b) by 297 days.

(21) Appl. No.: 18/061,399

(22) Filed: Dec. 2, 2022

(65) Prior Publication Data

US 2023/0321630 A1 Oct. 12, 2023

Related U.S. Application Data

(60) Provisional application No. 63/362,697, filed on Apr. 8, 2022.

(51) Int. Cl.
*B01J 20/34* (2006.01)
*B01D 61/46* (2006.01)
(Continued)

(52) U.S. Cl.
CPC ........ *B01J 20/3441* (2013.01); *B01D 61/461* (2022.08); *B01J 20/08* (2013.01); *B01J 20/28004* (2013.01); *B01J 20/28016* (2013.01); *B01J 20/3433* (2013.01); *B28B 19/0092* (2013.01); *C01F 7/021* (2013.01); *C04B 11/005* (2013.01); *C04B 11/02* (2013.01);
(Continued)

(58) Field of Classification Search
CPC .. B01J 20/3441; B01J 20/08; B01J 20/28004; B01J 20/28016; B01J 20/3433; B01D 61/461; B01D 2313/40; B01D 61/422; B01D 61/463; B28B 19/0092; C01F 7/021; C04B 11/005; C04B 11/02; C04B 2111/0062; C04B 11/26; C04B 28/14; C25B 1/01; C25B 1/50; C01P 2004/60; C01P 2006/80
See application file for complete search history.

(56) References Cited

U.S. PATENT DOCUMENTS 4,146,455 A 3/1979 McRae
4,226,688 A 10/1980 Kedem et al.
(Continued)

FOREIGN PATENT DOCUMENTS

JP S5431098 A 3/1979
JP H06269777 A * 9/1994
(Continued)

OTHER PUBLICATIONS

JP-H06269777—A Machine Translation of Description (Year: 2024).*
(Continued)

*Primary Examiner* — Cynthia L Schaller
(74) *Attorney, Agent, or Firm* — Vorys, Sater, Seymour and Pease LLP; Pradip Sahu; Philip T. Petti

(57) ABSTRACT

A method of recovering desalinated activated alumina (AA) beads from a composition including salt laden (high salt absorbed) activated alumna (AA) beads and free anions and free cations, comprising the step of electrodialysis of the composition to reduce salt content of the activated alumina (AA) beads to produce a stream comprising the desalinated activated alumina (AA) beads.

18 Claims, 3 Drawing Sheets

(51) Int. Cl.
*B01J 20/08* (2006.01)
*B01J 20/28* (2006.01)
*B28B 19/00* (2006.01)
*C01F 7/021* (2022.01)
*C04B 11/00* (2006.01)
*C04B 11/02* (2006.01)
*C25B 1/01* (2021.01)
*C25B 1/50* (2021.01)
*C04B 111/00* (2006.01)

(52) U.S. Cl.
CPC .................. *C25B 1/01* (2021.01); *C25B 1/50* (2021.01); *B01D 2313/40* (2013.01); *C01P 2004/60* (2013.01); *C01P 2006/80* (2013.01); *C04B 2111/0062* (2013.01)

(56) References Cited

U.S. PATENT DOCUMENTS

| | | | |
|---|---|---|---|
| 4,502,901 A * | 3/1985 | Burkard | C04B 11/264 106/784 |
| 4,508,607 A | 4/1985 | Winyall | |
| 5,324,403 A | 6/1994 | Kennedy et al. | |
| 5,882,524 A | 3/1999 | Storey et al. | |
| 5,961,803 A | 10/1999 | Landsfor et al. | |
| 7,059,805 B1 | 6/2006 | Addison, Sr. | |
| 8,100,198 B2 | 1/2012 | Fout et al. | |
| 8,267,200 B2 | 9/2012 | Fout et al. | |
| 10,016,726 B2 | 7/2018 | Lockhart et al. | |
| 2011/0302849 A1 | 12/2011 | Stenner et al. | |
| 2012/0214887 A1 | 8/2012 | Stav et al. | |
| 2014/0009103 A1 | 1/2014 | Nita | |
| 2018/0362370 A1 | 12/2018 | Shah et al. | |
| 2019/0270675 A1 | 9/2019 | Harrison et al. | |

FOREIGN PATENT DOCUMENTS

| | | | |
|---|---|---|---|
| JP | 2000321395 A | 11/2000 | |
| WO | 9404747 A1 | 3/1994 | |
| WO | WO-2014153623 A1 * | 10/2014 | ............ B01D 15/02 |
| WO | 2022214897 A1 | 10/2022 | |

OTHER PUBLICATIONS

Lounici et al., "Novel Technique to Regenerate Activated Alumina Bed Saturated by Fluoride Ions," Chemical Engineering Journal 81 (2001) 153-160, Elsevier Science B.V. www.elsevier.com/locate/cej. (Year: 2001).*

International Search Report and Written Opinion of the International Searching Authority mailed Jun. 21, 2023 to United States Gypsum Company for International Application No. PCT/US2023/017282 filed Apr. 3, 2023.

Wikipedia, "Electrodialysis", Retrieved from "https://en.wikipedia.org/w/index.php?title=Electrodialysis&oldid=1033242675", Jul. 12, 2021, 6 pages.

* cited by examiner

DESALINATION OF HIGH CHLORIDE SALT ABSORBED POROUS BEADS

FIELD OF THE INVENTION

The invention relates to a method employing electrodialysis for desalinization of salt laden (high salt absorbed) activated alumna (AA) beads.

BACKGROUND OF THE INVENTION

In the construction of buildings, one of the more common building elements for construction and remodeling is gypsum wallboard, often known as drywall, gypsum boards, gypsum panels, gypsum paneling, and ceiling tiles. In chemical terms, gypsum is calcium sulfate dihydrate ($CaSO_4 \cdot 2H_2O$).

Set gypsum is a well-known material that is used in such products. Panels containing set gypsum are often referred to as gypsum boards, which contain a board core layer (set gypsum core) sandwiched between two cover sheets, particularly paper cover sheets. Such panels are commonly used in drywall construction of the interior walls and ceilings of buildings. One or more denser regions, often referred to as "skim coats," may be included as layers on either face of the board core layer, usually at an interface (bond surface) between the board core layer and an inner surface of a cover sheet. The denser regions may be contiguous with a less dense region of the gypsum core following setting of the gypsum.

During manufacture of a gypsum board, stucco (containing calcium sulfate hemihydrate), water, and other ingredients as appropriate may be mixed, typically in a mixer to form an aqueous gypsum slurry. The terms of art aqueous gypsum slurry or aqueous slurry or gypsum slurry are typically employed for the slurry both before and after the calcium sulfate hemihydrate converts to calcium sulfate dihydrate. The gypsum slurry is formed and discharged from the mixer onto a moving conveyor carrying a first cover sheet, optionally bearing a skim coat. If present, the skim coat is applied upstream from the location where the gypsum slurry is discharged onto the first cover sheet. After applying the gypsum slurry to the first cover sheet, a second cover sheet, again optionally bearing a skim coat, is applied onto the gypsum slurry to form a sandwich assembly having a desired thickness. A forming plate, roller or the like may aid in setting the desired thickness. The gypsum slurry is then allowed to harden by forming set (i.e., rehydrated) gypsum through a reaction between the calcined gypsum and water to form a matrix of crystalline hydrated gypsum (i.e., calcium sulfate dihydrate, also known as set gypsum). The desired hydration of the calcined gypsum promotes formation of an interlocking matrix of set gypsum crystals, thereby imparting strength to the gypsum board. Heat may be applied (e.g., using a kiln) to drive off the remaining free (i.e., unreacted) water to yield a dry product. Then the set gypsum product is cut to form gypsum boards of desired length.

Gypsum (calcium sulfate dihydrate and any impurities) suitable for use in wallboard may be obtained from both natural and synthetic sources, followed by further processing. Synthetic gypsum (Syngyp) obtained from power plants during flue gas desulphurization is usually suitable for use in gypsum panels intended for construction projects. However, many conventional coal-fired power plants are being shut down in favor of more environmentally friendly sources of energy. The shutdown of coal-fired power plants has created a growing shortage of synthetic gypsum suitable for producing gypsum panels. Lower quality synthetic gypsum is available from power plants and other sources, but this alternatively sourced gypsum often contains fairly high concentrations of extraneous salts, particularly magnesium or sodium salts, more particularly magnesium chloride and sodium chloride. Small amounts of potassium chloride and calcium chloride may also be present in alternatively sourced synthetic gypsum. The extraneous salts can be problematic due to their tendency to decrease adhesion between the board core and the cover sheets, particularly a back paper cover sheet.

When calcium sulfate dihydrate from either a natural or synthetic source is heated sufficiently, in a process called calcining or calcination, the water of hydration is at least partially driven off and there can be formed either calcium sulfate hemihydrate ($CaSO_4 \cdot \frac{1}{2}H_2O$) (typically provided in the material commonly referred to as "stucco") or calcium sulfate anhydrite ($CaSO_4$) depending on the temperature and duration of exposure. As used herein, the terms "stucco" and "calcined gypsum" refer to both the hemihydrate and anhydrite forms of calcium sulfate that may be contained therein. Calcination of the gypsum to produce the hemihydrate form takes place by the following equation:

$$CaSO_4 \cdot 2H_2O \rightarrow CaSO_4 \cdot 0.5H_2O + 1.5H_2O$$

Calcined gypsum is capable of reacting with water to form calcium sulfate dihydrate, which is a rigid product and is referred to herein as "set gypsum."

U.S. patent application Ser. No. 17/643,523, filed Dec. 9, 2021, incorporated herein by reference, discloses a method to reduce the chloride salts from high-salt Syngyp mixed high salt gypsum (containing calcium sulfate dihydrate) powder particles, as received, which naturally contain a small amount (e.g. 5-30 wt. %) of free moisture with beads which are dry (have an absence of moisture, in other words 0% water) or may have up to 30 wt. % free moisture, preferably 10 wt. % to 20 wt. % free moisture. By "as received" in the context of gypsum is meant the high salt gypsum as received from a power plant (in the instance of syngyp) or other source. The beads are supplied dry but preferably extra water is added to increase its moisture percentage before use in the method of the invention. The mix ratio of the beads to the high salt gypsum powder particles is in the range of 5 to 50 parts by weight beads (including their free moisture) to 100 parts by weight high salt gypsum powder particles (including its free moisture). The beads generally have a volume mean diameter, or a mean length (largest dimension when it is not spherical), of particle size of 0.5 to 5 mm, preferably 1-4 or more preferably 2-4 mm.

Thus, porous beads such as activated alumina (AA) beads were used as the chloride salt absorber. When the AA beads were mixed with the partially wet high-salt synthetic gypsum, the beads removed a large amount of chloride salts from the high-salt synthetic gypsum. As a result, a low-salt synthetic gypsum was produced. In order to reuse the AA beads for the desalination of high-salt synthetic gypsum, the beads should also be desalinated.

U.S. Pat. No. 10,016,726 to Lockhart discloses a method of recovering purified partly-hydrolyzed cellulose particles from a composition comprising agglomerated partly-hydrolyzed cellulose particles and an acid, using electrodialysis. Following dilution, concentration by centrifuging or settling, and/or dialysis of the composition, the composition is treated in an electrodialysis cell to remove ions, such as free sulfate from sulfuric acid. The method may include having an anion exchange resin in the feed compartment of the electrodialysis cell, adding a base to the receiving solution in the electrodialysis cell, and a second step of electrodialysis of the purified partly-hydrolyzed cellulose particles.

U.S. Pat. No. 4,508,607 to Winyall discloses a process for preparing precipitated dialytic silica by electrodialysis which comprises:
(a) preparing an aqueous anolyte which contains a salt, and silica-containing seeds having a particle size of below 100 millimicrons;
(b) adding alkali metal silicate to the anolyte and subjecting said anolyte to electrodialysis to remove alkali metal ions at a pH of from about 5 to 10.5 and cause precipitation of silica; and
(c) recovering precipitated dialytic silica from said anolyte.

US20110302849 to Stenner et al. discloses a process for producing a suspension comprising:
a) adjusting the pH of a first suspension comprising at least one precipitated silica to a value in the range from 0.5 to 5 if the first suspension does not already have a pH in this range; and
b) purifying the first suspension by electrodialysis with an electrodialysis apparatus, wherein:
the electrodialysis apparatus comprises at least one electrodialysis cell configured so that at least one product region is separated from at least one catholyte region by a cation-exchange membrane and an electrode spacing is from 2 mm to 200 mm;
a potential from 5 to 1000 volts is applied; and
the suspension comprises at least one precipitated silica.

There is still a need for improved processes to desalinate salt laden activated alumina beads.

SUMMARY OF THE INVENTION

The invention provides a method employing electrodialysis (ED) to remove the chloride from the high salt absorbed AA beads.

The invention particularly relates to methods for removing from activated alumina beads appreciable quantities of extraneous salts, particularly chloride salts, and more particularly NaCl, KCl, $MgCl_2$ and/or $CaCl_2$.

The invention treats salt laden activated alumina (AA) beads having a high chloride salt concentration to produce desalinated activated alumina (AA) beads having a lower salt concentration to be suitable for reuse.

The salt laden activated alumina (AA) beads fed to the method may have greater than 500 ppm, greater than 5,000 ppm, greater than 10,000 ppm, or greater than 15,000 ppm by weight chloride anion on a dry basis. In other words, the salt laden activated alumina (AA) beads fed to the method may have greater than 500, greater than 5,000, greater than 10,000, or greater than 15,000 parts by weight chloride anion per 1,000,000 parts by weight said salt laden activated alumina (AA) beads on a dry basis. The salt laden beads activated alumina (AA) may typically have about 1,000 to about 15,000 ppm, 3,000 to about 12,000 ppm, or about 5,000 to about 10,000 ppm, or more typically about 3,000 to about 12,000 ppm by weight chloride anion on a dry basis. In other words, the salt laden activated alumina (AA) beads fed to the method may have about 1,000 to about 15,000 ppm, 3,000 to about 12,000, or about 5,000 to about 10,000, or more typically about 3,000 to about 12,000 parts by weight chloride anion per 1,000,000 parts by weight said salt laden activated alumina (AA) beads on a dry basis. The term salt laden activated alumina (AA) beads on a dry basis means actual weight of the beads including all salt adhered to the beads but without free moisture or any other water.

The desalinated activated alumina (AA) beads produced by the method may have less than 5,000 ppm, typically less than 3,000 ppm, more typically less than 1,000 ppm, furthermore typically less than 500 ppm, or less than 300 ppm by weight chloride anion on a dry basis. In other words, the desalinated activated alumina (AA) beads produced by the method may have less than 5,000, typically less than 3,000, more typically less than 1,000, furthermore typically less than 500, or less than 300 parts by weight chloride anion per 1,000,000 parts by weight said desalinated beads on a dry basis. The term desalinated activated alumina (AA) beads on a dry basis means actual weight of the desalinated beads including the salt (if any) adhered to the beads but without free moisture or any other water.

For example, the salt laden activated alumna (AA) beads may have greater than 10,000 ppm, or greater than 15,000 ppm, or 10,000 to 20,000 ppm chloride anion on a dry basis.

For example, the desalinated activated alumna (AA) beads may have less than 5,000 ppm, or less than 1,000 ppm, or less than 500 ppm, or less than 300 ppm chloride anion per 1,000,000 parts by weight of the desalinated activated alumina beads on a dry basis.

Electrodialysis (ED) is used to transport salt ions from one solution through ion-exchange membranes to another solution under the influence of an applied electric potential difference. This is done in a configuration called an electrodialysis cell. The cell consists of a feed (dilute) compartment and a concentrate (brine) compartment between two electrodes.

The inventive method of recovering desalinated activated alumina (AA) beads from a composition comprising salt laden activated alumna (AA) beads and free anions and free cations, wherein the salt of the salt laden activated alumna (AA) beads comprises a chloride salt, typically the salt comprises at least one of sodium chloride and potassium chloride, comprises:
electrodialysis of the composition to reduce chloride salt content of the activated alumina (AA) beads to produce a stream comprising the desalinated activated alumina (AA) beads, wherein the activated alumina (AA) beads have a D50 median particle size of 0.5 mm to 5 mm, preferably 1 to 4 mm, or 2 to 4 mm.

The invention also provides a method for making a gypsum board comprising:
recovering desalinated activated alumina (AA) beads from a composition comprising the salt laden activated alumna (AA) beads and free anions and free cations by the inventive method of recovering desalinated activated alumina (AA) beads; and
treating a salt-containing gypsum source comprising salt-containing gypsum powder particles with the desalinated activated alumina (AA) beads, said treating comprising:
mixing the desalinated activated alumina (AA) beads, which have an absence of moisture or up to 30% free moisture, typically 5-30 wt. % free moisture, preferably 10% - 20% free moisture, with the salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the chloride salt absorbing beads to the salt-containing gypsum powder particles in a range 5 to 50 parts by weight beads to 100 parts by weight salt-containing gypsum powder particles on a moisture inclusive basis, to transfer chloride salt from the salt-containing gypsum powder particles to the desalinated activated alumina (AA) beads to produce a mixture of salt laden activated alumina (AA) beads and treated gypsum powder particles, wherein the salt laden activated alumina (AA) beads are all larger in particle size than the treated gypsum powder particles;

wherein the salt-containing gypsum powder particles comprise at least 80 wt. %, preferably at least 90 wt. %, calcium sulfate dihydrate on a dry basis, wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis, wherein the salt-containing gypsum powder particles have a D50 median particle size of 10 to 100 microns, preferably D50 median particle size of 30 to 50 microns, wherein the desalinated activated alumina (AA) beads have a D50 median particle size of 0.5 mm to 5 mm, preferably 1 to 4 mm or 2 to 4 mm, and after said mixing of the desalinated activated alumina (AA) beads with the salt-containing gypsum powder particles, drying the mixture of the salt laden activated alumina (AA) beads and the treated gypsum powder particles and separating the treated gypsum powder particles from the salt laden activated alumina (AA) beads to recover the treated gypsum powder particles and recover the salt laden activated alumina (AA) beads;

calcining the recovered treated gypsum powder particles to make stucco comprising calcium sulfate hemihydrate;

mixing the stucco with water to form an aqueous gypsum slurry comprising the calcium sulfate hemihydrate;

depositing the aqueous gypsum slurry on a surface to form a layer of the aqueous gypsum slurry;

allowing the deposited layer of the aqueous gypsum slurry to set to form a layer comprising set gypsum;

cutting and drying the layer comprising set gypsum to make the gypsum board comprising the set gypsum as a core layer.

The invention also provides the gypsum board made by this method.

The invention also provides a method for making a gypsum board comprising:

recovering desalinated activated alumina (AA) beads from a composition comprising the salt laden activated alumna (AA) beads and free anions and free cations by the inventive method of recovering desalinated activated alumina (AA) beads; and treating a salt-containing gypsum source comprising salt-containing gypsum powder particles with the desalinated activated alumina (AA) beads, said treating comprising:

mixing the desalinated activated alumina (AA) beads, which have an absence of moisture or up to 30% free moisture, typically 5-30 wt. % free moisture, preferably 10%-20% free moisture, with the salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the chloride salt absorbing beads to the salt-containing gypsum powder particles in a range 5 to 50 parts by weight beads to 100 parts by weight salt-containing gypsum powder particles on a moisture inclusive basis, to transfer chloride salt from the salt-containing gypsum powder particles to the desalinated activated alumina (AA) beads to produce a mixture of salt laden activated alumina (AA) beads and treated gypsum powder particles, wherein the salt laden activated alumina (AA) beads are all larger in particle size than the treated gypsum powder particles;

wherein the salt-containing gypsum powder particles comprise at least 80 wt. %, preferably at least 90 wt. %, calcium sulfate dihydrate on a dry basis, wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis, wherein the salt-containing gypsum powder particles have a D50 median particle size of 10 to 100 microns, preferably D50 median particle size of 30 to 50 microns, wherein the desalinated activated alumina (AA) beads have a D50 median particle size of 0.5 mm to 5 mm, preferably 1 to 4 mm or 2 to 4 mm, and after said mixing of the desalinated activated alumina (AA) beads with the salt-containing gypsum powder particles, drying the mixture of the salt laden activated alumina (AA) beads and the treated gypsum powder particles and separating the treated gypsum powder particles from the salt laden activated alumina (AA) beads to recover the treated gypsum powder particles and recover the salt laden activated alumina (AA) beads;

calcining the recovered treated gypsum powder particles to make stucco comprising calcium sulfate hemihydrate;

mixing the stucco with water to form an aqueous gypsum slurry comprising the calcium sulfate hemihydrate;

depositing the aqueous gypsum slurry on a surface to form a layer of the aqueous gypsum slurry;

allowing the deposited layer of the aqueous gypsum slurry to set to form a layer comprising set gypsum;

cutting and drying the layer comprising set gypsum to make the gypsum board comprising the set gypsum as a core layer.

The invention also comprises a gypsum board made by this method.

The invention operates over a wide pH range. For example, the initial electrodialysis is conducted at a pH of from about 1 to about 7 and the final electrodialysis is conducted at a pH of from about 5 to about 12.5, for example about 6.5 to about 10.5. Initial electrodialysis is the electrodialysis when the composition first contacts the current or when the current is turned on in the presence of the composition undergoing electrodialysis. Final electrodialysis is when the composition no longer contacts the current or when the current is turned off in the presence of the composition that was undergoing electrodialysis.

The invention does not require seeds or chemicals, except for electrolyte, to be added to the water and salt laden beads-containing composition undergoing electrodialysis. Preferably the water and salt laden beads-containing composition undergoing electrodialysis has an absence of additional seeds or chemicals, except for electrolyte.

The salt laden (high salt absorbed) activated alumna (AA) beads are porous materials.

The term bead in the context of the present invention, may be in the form of balls, extruded pieces or the like. Beads may be rounded. The beads generally have a length to diameter ratio of 1-3:1. The beads generally have a volume mean diameter, or a mean length (largest dimension when it is not spherical), of particle size of 0.5 mm to 5 mm, preferably 1-4 or more preferably 2-4 mm. Each bead can be made of thousands of small particles. These small particles can themselves be porous or nonporous. These small particles are bonded to form a "porous" bead. The term porous bead is meant to be a bead having a "porous" structure created from void spaces between the small particles and, if the small particles are also porous, the pores of the small particles themselves. The interstitial surface area of the voids and pores of the beads contributes to the specific surface area of the beads.

Specific surface area (SSA) is a property of solids defined as the total surface area of a material per unit of mass (S), (with units of $m^2/kg$ or $m^2/g$) or solid or bulk volume ($S_V$) (units of $m^2/m^3$ or $m^{-1}$). The specific surface area based on the solid volume is denoted by $S_O$. Typically the beads employed in the present invention have a specific surface area (S) of >20 $m^2/g$, more typically >50 $m^2/g$, furthermore typically >100 $m^2/g$, preferably >200 $m^2/g$. A number of international standards exist for the measurement of specific surface area, including ISO standard 9277 which is suitable for measuring specific surface area of beads of the present invention.

Fine materials will exhibit much greater specific surface area than will coarse materials. Some fine porous materials contain an enormous specific surface area. For example the specific surface area of sandstone may be in the order of 1500 $cm^2/cm^3$. The specific surface area of a porous material is affected by porosity, by mode of packing, by the grain size and by the shape of the grains. For example, disc shaped particles will exhibit a much larger specific area than will spherical ones.

Unless specified otherwise, when the specification indicates a dry basis this is a water free basis. Thus, a dry basis is also a moisture free basis.

All average molecular weights, percentages and ratios used herein, are by weight (i.e., wt. %) unless otherwise indicated. When the specification indicates D50 it is Dn50 which is number D50. As is known in the art Dn50 is known as number median, it physically represents that each number of particles greater or smaller than such value takes account of 50% of the total particles number.

DETAILED DESCRIPTION OF THE INVENTION

Activated Alumina Beads

Figure 1:
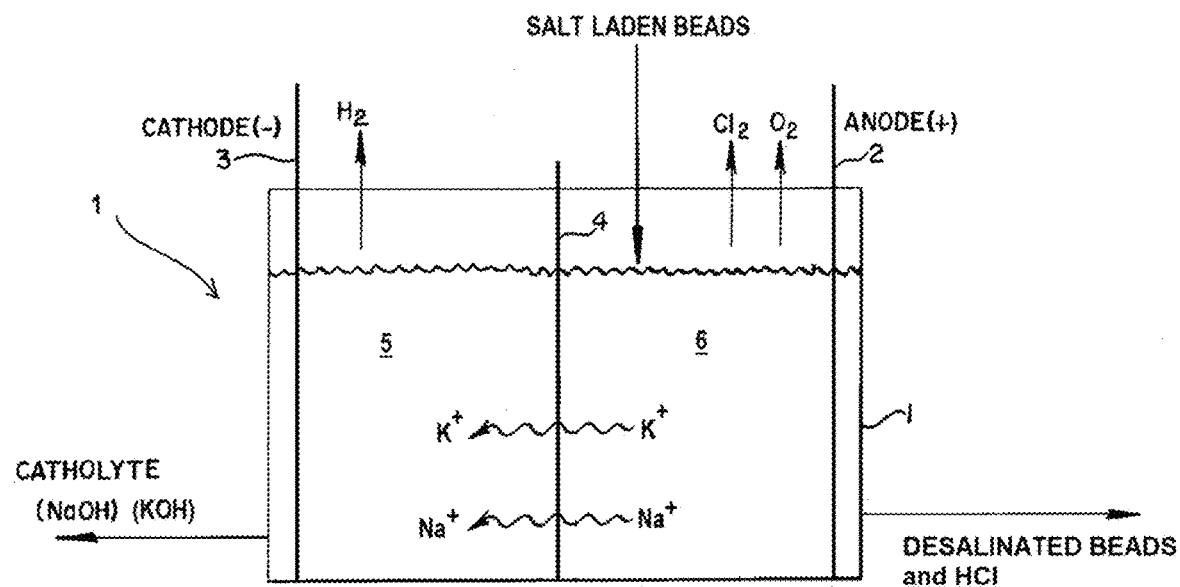
FIG. 1 schematically shows a typical electrodialysis device (electrodialysis tank) for use in the invention.

The beads may be activated alumina. Activated alumina beads are porous. The beads typically have a D50 median particle size (volume mean diameter, or a mean length (largest dimension when it is not spherical)) of 0.5-5 mm, preferably 1-4 mm or 2-4 mm. The beads typically have a specific surface area of >20 $m^2/g$, more typically >50 $m^2/g$, furthermore typically >100 $m^2/g$ or preferably >200 $m^2/g$. As mentioned above, each bead can be made of thousands of small particles. These small particles can be nonporous or porous materials.

Activated alumina is a highly porous form of aluminum oxide. Activated aluminate beads have a high specific surface area due to the many "tunnel like" pores that they have. Any suitable, activated alumina may be used. Suitable activated alumina is characterized as workable, or dehydrated with a loss on ignition (LOI) characteristic of preferably less than or equal to 20, and most preferably, an LOI of less than or equal to 10. The activated alumina may be manufactured by any process that produces a very large surface area on each particle of alumina, and the large surface area may be manifested by a very rough surface characterized by small pits, voids, and other surface irregularities. These surface irregularities may be effective at capturing small particles that impinge on the surface. Preferably, the activated alumina may be manufactured in such a way that the surface has a net negative electrical charge, thereby allowing positively charged ions, such as certain metals, to attach themselves to the activated alumina.

Activated alumina has a large specific surface area and is active in a reaction such as decomposition, isomerization, hydrogenation, dehydrogenation and dehydration. It is, therefore, generally used as a catalyst or catalyst support. Activated alumina is generally prepared by extracting alumina from an alumina-rich mineral such as bauxite, kaolin, acid white clay and colloidal clay; converting the alumina into alumina hydrate by hydrolysis or neutralization; and then activating the hydrate. Activated alumina contains 0 to 0.5 moles of water per one mole of $Al_2O_3$. The content varies depending on a process temperature during heating and dehydrating alumina trihydrate which is a starting material of the activated alumina.

In a Bayer process, the most typical process of the industrial preparation processes for alumina, bauxite as a starting material is ground and the resultant powder is treated with a hot solution of sodium hydroxide to elute alumina as sodium aluminate, during which the substantially whole amounts of impurities such as iron oxides, silica and titanium oxide are separated as an insoluble residue. If there exists alkali-soluble silica, it reacts with alkali and alumina to form an alkali aluminosilicate hydrate which is insoluble. The residue is removed by filtration and the filtrate, a sodium aluminate solution, is appropriately diluted. To the solution, a seed of gibbsite, which is crystalline alumina trihydrate, is added at an appropriate temperature. While stirring the mixture, aluminum hydroxide is precipitated. The precipitate is collected by filtration, washed with water and dried to give sodium-rich alumina trihydrate (gibbsite). The alumina trihydrate can be heated and dehydrated to give various activated aluminas containing 0 to 0.5 moles of water per 1 mole of $Al_2O_3$. In the course of conversion into a-alumina as anhydrous alumina by dehydration, there exist seven types of metastable aluminas, generally called activated alumina structures, including kappa-, theta-, delta, eta-, chi- and rho-alumina structures in addition to a typical gamma-alumina structure (See, for example, Publication Department, Kaken Research Center Management Development Center "Novel High Performance Adsorbents (Experimental Data Collection)", p. 361, published on Apr. 5, 1976).

A specific surface area in activated alumina is generally about 100 to 400 m$^2$/g. In case that an average pore radius is 2.5 nm to 8.0 nm both inclusive, for example, a pore volume range is 0.125 to 0.4 mL/g when a specific surface area is 100 m$^2$/g, and a pore volume range is 0.5 to 1.6 mL/g when a specific surface area is 400 m$^2$/g. Activated alumina in which a specific surface area and a pore volume are within these ranges may be suitably used in the present invention.

Chloride Salts

The beads to be treated contains chloride anions. The concentration of the chloride anion in the salt laden beads fed to the method may have greater than 500 ppm, greater than 5,000 ppm, greater than 10,000 ppm, or greater than 15,000 ppm by weight chloride anion on a dry basis. In other words, the salt laden activated alumina (AA) beads fed to the method may have greater than 500, greater than 5,000, greater than 10,000, or greater than 15,000 parts by weight chloride anion per 1,000,000 parts by weight said salt laden activated alumina (AA) beads on a dry basis. The salt laden beads activated alumina (AA) may typically have about 1,000 to about 15,000 ppm, 3,000 to about 12,000 ppm, or about 5,000 to about 10,000 ppm, or more typically about 3,000 to about 12,000 ppm by weight chloride anion on a dry basis.

Chloride salts are any salts which contain chloride. Thus, they include monovalent salts of chloride anion and a monovalent cation, such as sodium or potassium. Thus, they include divalent salts of chloride anions and a divalent cation, such as calcium or magnesium. Other chloride salts, are also contemplated, such as trivalent salts of chloride anions and a trivalent cation. Generally, the one or more chloride salts may be selected from the group consisting of NaCl, KCl, MgCl$_2$, CaCl$_2$ and any combination thereof.

The desalinated activated alumina (AA) beads produced by the method may have less than 5,000 ppm, typically less than 3,000 ppm, more typically less than 1,000 ppm, furthermore typically less than 500 ppm, or less than 300 ppm by weight chloride anion on a dry basis.

Typically the method removes a sufficient amount of these chloride salts to produce desalinated beads which removes at least 25 wt. %, for example 25 to 99 wt. %, for example 50 to 99 wt % or 25 to 50 wt. %, of the chloride anion from the beads fed to the method. Preferably the method removes at least 70 wt. %, for example, 75 to 95% wt. % of the chloride anion from the beads fed to the method.

In particular, the method removes at least 25 wt. %, typically 25 to 99 wt. %, for example 50 to 99 wt % or 25 to 50 wt. %, of the chloride anion from the beads fed to the method per pass through the method. By recycling all or a portion of the treated beads to be retreated, for instance one or two more times, according to the method of the invention, this can reduce chloride anion concentration in the gypsum by over 75 wt. %, for example, 75 to 95% wt. % relative to the chloride anion concentration in the original gypsum prior to any treating according to the invention.

The process may be operated in a batch, semi-batch, or continuous mode. However, typically the method is run as a batch mode.

Electrodialysis

The invention employs an electrodialysis device (also known as an electrodialysis tank) comprising an electrodialysis cell having a diluate chamber (also known as a feed compartment or anode compartment) and a concentrate chamber (also known as a brine compartment or cathode compartment) between two electrodes.

The chloride salt laden beads are placed in the diluate chamber (feed compartment or anode compartment). Water and electrolyte are placed in the diluate chamber (feed compartment or anode compartment) and the concentrate chamber (brine compartment or cathode compartment). Typically the diluate chamber and the concentrate chamber are separated by a cation exchange membrane (also known as a cation selective membrane). If there is no membrane the invention may simply put the salt laden beads in the single chamber between the two electrodes of the electrodialysis cell. If the invention uses the membrane, the beads should be in the dilute chamber of the electrodialysis cell. The dilute chamber and concentrate chamber are typically between the two electrodes, separated by the membrane. The electrodialysis cell can contain multiple dilute and concentrate chambers.

Preferably the dilute chamber (feed compartment or anode compartment) and the concentrate chamber (brine compartment or cathode compartment) are formed by an anion exchange membrane (anion selective membrane) and/or a cation exchange membrane (cation selective membrane) placed between the two electrodes. Typically, the electrodialysis device has multiple electrodialysis cells that are arranged into a configuration called an electrodialysis stack, with alternating anion-exchange membranes and cation-exchange membranes forming the multiple electrodialysis cells.

Electrochemical cells for an electrodialysis device are well known as such and any conventional cell with at least two compartments can be used in the process of the invention. Principally a two-compartment electrochemical cell contains a cathode in a cathode compartment and an anode in an anode compartment. A voltage is applied across the electrodialysis device until the desired (target) concentration of sodium and/or potassium ions is achieved in the diluate chamber. At the anode, oxygen and protons are produced by water splitting. In the anolyte, the protons combine with the chloride ions to form hydrochloric acid. At the anode, chlorine gas is formed by oxidation of chloride ions if the formation of chlorine is enhanced. Preferably between the cathode and anode is a separator such as a membrane or diaphragm. The use of a separator minimizes the risk of chlorine migration from the anode to the cathode where the chlorine can be reduced back to chloride or hydrolyzed to chlorate. Hydrogen and hydroxyl ions are produced at the cathode. Sodium ions from salt laden beads migrate through the membrane or diaphragm to the catholyte for production of sodium hydroxide. A catholyte is the part of an electrolyte which is on the cathode side of an electrochemical cell that is divided into compartments.

FIG. 1 schematically shows a typical electrodialysis device 1 (electrodialysis tan use in the invention. The electrodialysis device 1 has a dilute chamber (anode compartment and a concentrate chamber (cathode compartment 6). Electrodes 2 and 3 are respectively placed in the vicinity of two opposed sides of the electrodialysis device 1. In the electrodialysis device 1, sodium and/or potassium from the salt on the salt laden (high salt absorbed) activated alumna (AA) beads migrate towards the cathode 3 (preferably through a cation selective membrane 4) and form sodium hydroxide, potassium hydroxide, and H$_2$ gas. Chloride from the salt migrates towards the anode 2 (preferably through an anion selective membrane, not shown) and forms acid (HCl), Cl$_2$ gas and O$_2$ gas. A voltage is applied across the electrodialysis device 1 until the desired (target) concentration of sodium and/or potassium ions is achieved in the dilute chamber (anode compartment 5).

The process may be operated in a batch, semi-batch, or continuous mode. The process is typically operated in a batch mode.

In batch operation, the salt laden (high salt absorbed) AA beads are placed in the at least one electrodialysis cell of the electrodialysis device and undergoes electrodialysis while water and electrolyte either remain in the electrodialysis cell or flow through or recirculate through the electrodialysis cell. The high salt absorbed AA beads water and electrolyte are added to the electrodialysis cell at the start of the process, if performed as a batch process.

Semi-batch operation is defined as running parallel electrodialysis cells in batch mode wherein while beads are being added to at least one electrodialysis cell, simultaneously beads undergo electrodialysis in at least one other electrodialysis cell, and/or beads are being removed from at least one other electrodialysis cell.

In continuous operation a slurry or suspension of the high salt absorbed AA beads, water and electrolyte circulate through the electrodialysis device while the beads undergo electrodialysis. Thus, if performed as a continuous process the high salt absorbed AA beads are fed to an inlet the electrodialysis device as the cleaned AA beads are discharged from an outlet the electrodialysis device.

The electrodes can be, e.g., of the gas diffusion or porous net type or plane-parallel plates. The electrodes can be passive or activated to enhance the reactivity at the electrode surface. The electrodes used in the electrodialysis treatment, can be of the conventional type. The anode 2 and the cathode 3 may be made of the same material. The material of the anode 2 may be lead, graphite, titanium, coated titanium, lead oxides, tin oxide, tantalum or titanium, or combinations thereof. The material of the cathode 3 may be steel or nickel, suitably nickel, graphite, titanium, coated titanium or activated nickel.

The membrane 4 used in the electrodialysis device 1 of the present invention can be homogeneous or heterogeneous, organic or inorganic. Furthermore, the membrane 4 can be of the molecular screen type, the ion-exchange type or salt bridge type. The cell 1 is suitably equipped with a membrane 4 of the ion-exchange type. The membranes of the ion-exchange type can be cationic or anionic. The use of a cation exchange membrane makes it possible to produce pure alkali metal hydroxide in the cathode compartment 5.

Generally, the temperature in the anolyte can be in the range from about 10 up to about 80° C., suitably in the range from 20 up to 50° C. and preferably in the range from 25 up to 50° C. Anolyte is the electrolyte on the anode side of an electrochemical cell that is divided into compartments. The current density can typically be in the range from about 1 up to about 10 kA/m$^2$, suitably in the range from 1.5 up to 6 kA/m$^2$.

Illustrative examples of the electrolyte salt include quaternary ammonium salts such as tetramethylammonium hexafluorophosphate, tetraethylammonium hexafluorophosphate, tetrapropylammonium hexafluorophosphate, methyltriethylammonium hexafluorophosphate, tetraethylammonium tetrafluoroborate and tetraethylammonium perchlorate.

Figure 2:
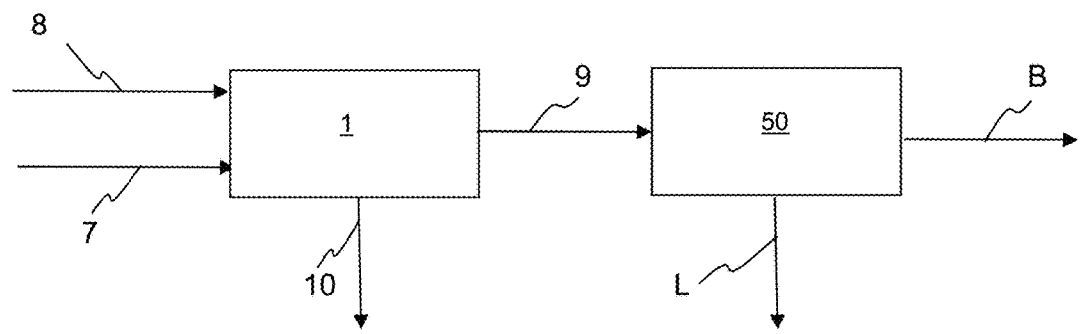
FIG. 2 shows a system that comprises an electrodialysis device and a separation unit.

FIG. 2 shows a system that comprises an electrodialysis device 1 and a separation unit 50. The electrodialysis device 1 receives a first, or feed, stream 7 of the salt laden beads, water and electrolyte. For example, the first stream 7 may have a chloride anion concentration of 50 to 500 ppm by weight of water. This means 50 to 500 parts by weight chloride anion per 1,000,000 parts by weight water. The electrodialysis device 1 may also receive a second aqueous stream 8 that may have some chloride ion concentration. For example, the second aqueous stream 8 may have a chloride ion concentration of 100 to 1000 ppm by weight of water.

The electrodialysis device 1 draws ions out of the feed stream 7 and produces a third stream 9 that has the beads and a lower concentration of chloride ions than the first stream 7 and a fourth stream 10 that has a higher concentration of chloride in the form of HCl (other chloride may escape as chloride gas). The third stream 9 flows to a solids liquids separation unit 50. The solids liquids separation unit 50 produces a fourth stream B that has the separated desalinated beads and a fifth stream L that has the separated liquids (typically the anolyte). The solids liquid separation unit 50 may be any suitable mechanical separation unit. For example, it may include a trommel (a usually cylindrical or conical revolving screen used for screening) or a vibrating screen.

As described above, the electrodialysis cell 1 comprises a pair of electrodes configured to act as an anode and a cathode, as for example electrodialysis cell 1 shown in FIG. 1. Preferably there is a membrane between the anode and the cathode. Typically, electrodialysis cell 1 has a plurality of alternating anion-permeable (also known as anion selective membranes) and cation-permeable membranes (also known as cation selective membranes) disposed between the anode and the cathode to form a series of alternating dilute and concentrate channels between them (See for example, FIG. 4). The anion-permeable membranes allow the passage of anions through the membrane. The cation-permeable membranes allow the passage of cations through the membrane. Additionally, the electrodialysis cell 1 may further comprise a plurality of spacers disposed between each pair of the membranes, and between the electrodes and the adjacent membranes.

While applying electrical current to the electrodialysis cell 1 having multiple chambers for parallel flow, the first stream 7 passes through the dilute channels and the second stream 8 passes through the concentrate channels. The second stream 8 may be a solution including various salts and ions. In the dilute channels, the first stream 7 is ionized. Cations migrate through the cation-permeable membranes towards the cathode to enter into the adjacent concentrate channels (concentrating chambers). Anions migrate through the anion-permeable membranes towards the anode to enter into adjacent concentrate channels. While the electrical field exerts a force on the ions toward the respective electrode (e.g. anions are pulled toward the anode) the anions and cations cannot re-enter the dilute channels (desalting chambers), the first stream 7 passes through the dilute channels and the second stream 8 passes through the concentrate channels. The second stream 8 may be a solution of dissolved solids, including various salts and ions. In the dilute channels, the first stream 7 is ionized. Cations migrate through the cation-permeable membranes towards the cathode to enter into the adjacent concentrate channels. Anions migrate through the anion-permeable membranes towards the anode to enter into adjacent concentrate channels. While the electrical field exerts a force on the ions toward the respective electrode (e.g. anions are pulled toward the anode) the anions and cations cannot re-enter the dilute channels.

The concentration of chloride ions in the second stream 8 increases as it passes through the concentrate channels and carries the anions and cations out of the electrodialysis device 1. As the second stream 8 passes through the electrodialysis device 1, its ionic content increases and the second 8 transitions into the fourth stream 10. The fourth stream 10 has a higher chloride ionic content than the second stream 8.

The second stream 8 may be made up of make-up water, water diverted from the first stream 7, or water diverted from another available water source. Optionally, a portion of the separated liquid stream L may be recycled to the second stream 8 but for an amount of the separated liquid stream L that is removed in a blowdown line (not shown).

Stationary Bead and Liquid Batch Operation

Figure 3:
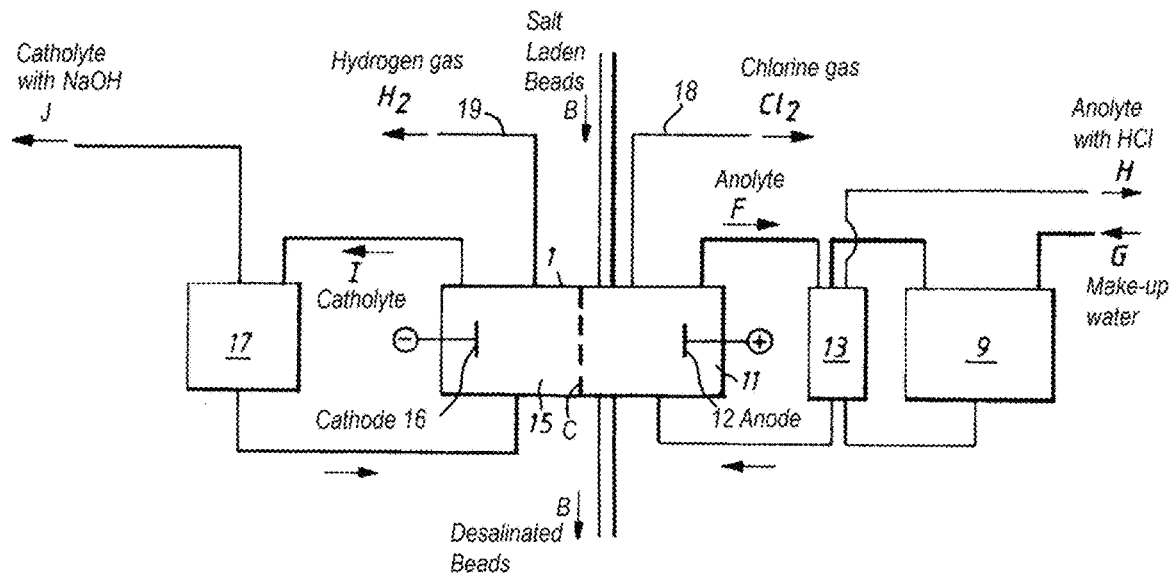
FIG. 3 shows a process operated with the beads, water and electrolyte remaining in place in the electrodialysis device 1 during the electrodialysis.

FIG. 3 shows a process operated with the beads remaining in place as water and electrolyte remains or circulates in the electrodialysis device 1 during the electrodialysis.

The salt laden beads B are added to the anode compartment 11 of the electrodialysis device 1. Optionally these beads are pre-wetted in a small amount of water, before being added to the electrodialysis device 1. The anode compartment 11 has an anode 12. The electrodialysis device 1 also has a cathode compartment 15 having a cathode 16. The anode compartment 11 and cathode compartment 15 of the electrodialysis device 1 can be separated by a cation exchange membrane (C).

Then water and electrolyte, for example tetraethylammonium tetrafluoroborate, are added to the AA beads B and water into the anode compartment 11 (also known as a dilution or desalting chamber) of the electrodialysis device 1. The water and electrolyte are also added to the cathode compartment 15 (also known as a concentration chamber) of the electrodialysis device 1.

An electric current is run through the mixture of water, activated alumina and electrolyte in the electrodialysis device 1. The current density of the electrodialysis device 1 is, for example, about 1.5 kA/m$^2$ and the temperature of the electrodialysis device 1 is regulated to a suitable temperature, for example, about 50° C.

The electrodialysis treatment results in a chloride and potassium/sodium enriched catholyte solution I which is separated and preferably sent to further treatment. The electrodialysis treatment results in a chloride and potassium/sodium depleted anolyte solution F. After sufficient removal of chloride and potassium/sodium salts the cleaned beads B may be removed from the electrodialysis device 1 and separated from the liquid. Typically the removed and desalinated beads B are subjected to further solids-liquid separation treatment (not shown), e.g. by filtration or other drying step. Chlorine formed on the anode 12 may be withdrawn through a gas vent 18. Sodium hydroxide and hydrogen gas may be formed in the cathode compartment of the cell 15). The hydrogen gas formed on the cathode 16 is withdrawn through a gas vent 19.

In operation of the electrodialysis device 1 of FIG. 3 the chloride and potassium/sodium depleted solution (anolyte mixture F) may remain in the anode compartment 11 and the catholyte I may remain in the anode compartment 11 during electrodialysis to discharge at the end of electrolysis. At the end of electrolysis, the anolyte F and catholyte I are removed from the electrodialysis device 1 and the desalinated beads B are removed from the electrodialysis device 1.

Stationary Bead With Flowing Liquids Batch Operation

Alternatively, in operation of the electrodialysis device 1 of FIG. 3 the anolyte F may circulate through the anode compartment 11 and the catholyte I may circulate through the anode compartment 11 during electrodialysis. Thus, if desired the beads B may remain in the electrodialysis device 1 while the water and electrolyte circulate into and out of the electrodialysis device 1. In this case, the electrodialysis treatment results in anolyte mixture F (a chloride and potassium/sodium depleted solution) that may be recirculated to the electrodialysis device 1 until the resulting anolyte mixture F has a sufficiently low level of chloride and potassium/sodium. This anolyte mixture F is withdrawn from the top of the electrodialysis device 1 and a portion may be brought to a tank 9 for liberation of gas. The major portion of the anolyte mixture F is recirculated directly to the anode compartment 11 by way of an anolyte recirculation tank 13. A portion of the anolyte mixture H with HCl is removed. After sufficient removal of chloride and potassium/sodium salts the cleaned beads B may be removed from the electrodialysis device 1 and separated from the liquid. Typically the removed and desalinated beads B are subjected to further solids-liquid separation treatment (not shown), e.g., by screening, filtration or other drying step. Make-up water G may be added to make up for the water split during electrolysis.

The catholyte mixture I is withdrawn at the top of the electrodialysis device 1. The major portion of the catholyte mixture I is recirculated directly to the cathode compartment of the cell 15 by way of a catholyte recirculation tank 17, to increase the concentration of sodium and/or potassium hydroxide. When the concentration of hydroxide is sufficient, for example in the range from 100 up to 200 g/liter, a portion of the catholyte J with NaOH and or KOH can be withdrawn from the electrodialysis device 1.

Continuous Operation

Figure 4:
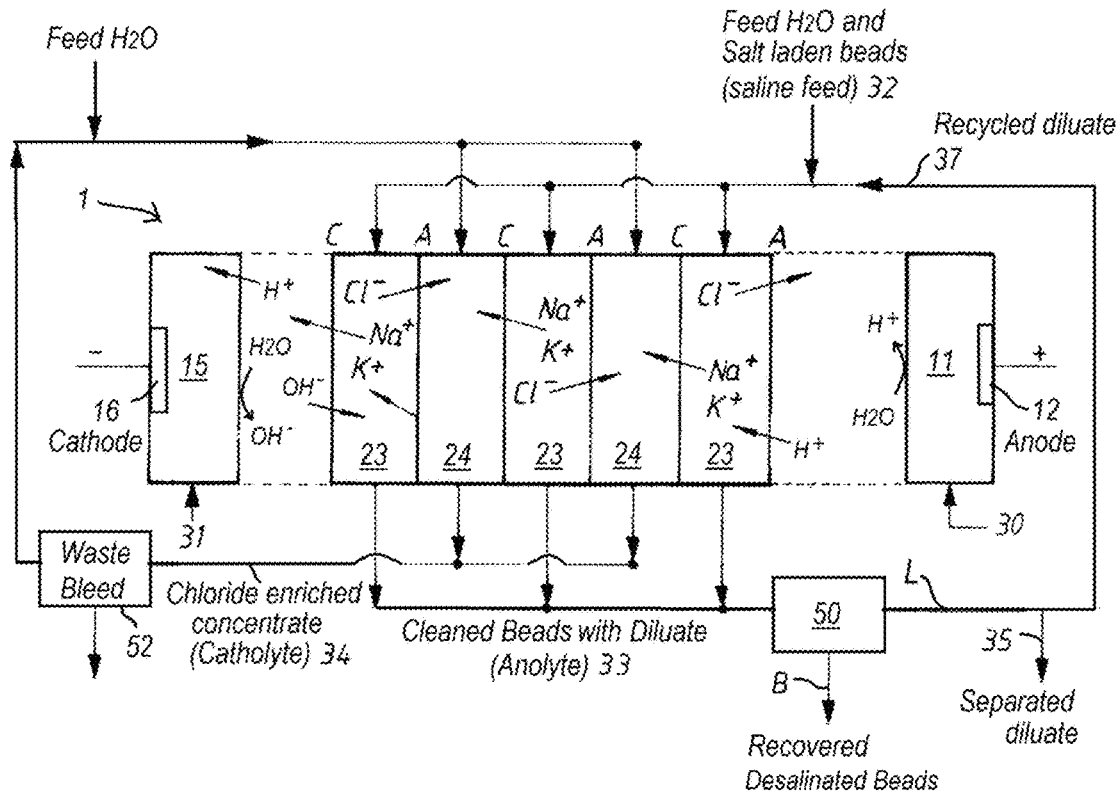
FIG. 4 shows, a continuous embodiment for desalinization of the beads that employs an electrodialysis device comprising at least one anion selective membrane and one cation selective membrane between an anode and a cathode.

FIG. 4 shows, a continuous embodiment for desalinization of the beads that employs an electrodialysis device 1 comprising at least one anion selective (anion exchange) membrane A and one cation selective (cation exchange) membrane C between an anode 12 and a cathode 16. Normally the electrodialysis device 1 comprises multiple pairs of alternating anion selective A and cation selective C membranes between one anode 12 and one cathode 16.

A slurry or suspension of salt laden beads, water and electrolyte 32 passes through desalting chambers 23 defined between alternating cation selective membranes C and anion selective membranes A. The membranes A,C are spaced from each other to form alternating desalting chambers 23 and concentrating chambers 24. The chambers 23, 34 have inlets and outlets for feeding liquids to and withdrawing liquids from the chambers. The combination of a desalting chamber 23 and concentrating chamber 24 constitutes a cell pair. Any number of cell pairs can be stacked between a pair of electrodes 12, 16 to produce a demineralization stack for the cell 10.

At the anode 12, a recirculating stream known as an anode-solution electrolyte stream is added and is passed in contact with the anode 12 within the anode chamber 11.

At the cathode 16, a similar recirculating stream known as a cathode-solution electrolyte stream 31 is added and is passed in contact with the cathode 16 within the cathode chamber 15.

When the salt laden bead slurry 32 is fed into the electrodialysis device 1, the anions, e.g. chloride, will migrate from desalting chamber 23 through the selective membrane A towards the anode 11 and the cations, e.g. potassium and sodium ions, will migrate through the cation selective membrane C towards the cathode 16. The water solution in which the beads are located will be depleted in salt and discharges as diluate (anolyte) 33. The water solution into which the ions are migrating may be prepared in the concentrating chambers 24 of the electrodialysis device 1 and discharges as chloride enriched concentrate 34. The diluate 33 with the cleaned beads may be subjected to liquid solid separation to separate cleaned (desalinated) beads B from liquid L. The liquid L can be recovered as recovered liquid stream 35 or recycled as recycle stream 37 to the electrodialysis device 1 to be subjected to one or more desalination treatments, for further reduction of the salt content therein until a sufficiently low concentration of potassium and sodium is achieved. The cleaned beads B are subjected to further solids-liquid separation treatment 50, e.g., by screening, filtration or other drying step. Electrodialysis can be performed in electrodialysis stacks operating in parallel and/or in series, and with liquid stream flow in parallel and/or in series.

Pre-Wetting Beads

Pre-wetting to make "Wet" beads can be done by keeping the beads in a humidified condition, such as in a 90° F. and 90% relative humidity (RH) room, or directly spraying water on them. Typically to pre-wet the salt laden beads water is sprayed onto the beads during shaking.

Use of the Desalinated Beads

The desalinated activated alumina (AA) beads made according to the present invention may be employed in a method of treating a salt-containing gypsum source comprising salt-containing gypsum powder particles, comprising:

mixing the desalinated salt absorbing activated alumina (AA) beads, which have an absence of moisture or up to 30% free moisture, typically 5-30 wt. % free moisture, preferably 10% -20% free moisture, with salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the desalinated salt absorbing activated alumina (AA) beads to the high salt gypsum powder particles in a range 5 to 50 parts by weight beads to 100 parts by weight high salt gypsum particles on a moisture inclusive basis, to transfer chloride salt from the salt-containing gypsum powder particles to the desalinated salt absorbing activated alumina (AA) beads to produce a mixture of salt laden activated alumina (AA) beads and treated gypsum powder particles, wherein the salt laden activated alumina (AA) beads are all larger in particle size than the treated gypsum powder particles;

wherein the salt-containing gypsum powder particles comprise at least 80 wt. %%, preferably at least 90 wt. %, calcium sulfate dihydrate on a dry basis, wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis, wherein the salt-containing gypsum powder particles have a D50 median particle size of 10 to 100 microns, preferably D50 median particle size of 30 to 50 microns, wherein the desalinated salt absorbing beads have a D50 median particle size of 0.5 mm to 5 mm, preferably 1 to 4 mm or 2 to 4 mm, and after said mixing of the desalinated activated alumina (AA) beads with the salt-containing gypsum powder particles, drying the mixture of the salt laden activated alumina (AA) beads and the treated gypsum powder particles and separating the treated gypsum powder particles from the salt laden activated alumina (AA) beads to recover the treated gypsum powder particles and recover the salt laden activated alumina (AA) beads.

Uses of the Treated Gypsum

The synthetic gypsum and other gypsum particles that have been treated to reduce their high chloride salt concentrations with activated alumina (AA) beads may be calcined to convert the calcium sulfate dihydrate in the treated gypsum into stucco comprising calcium sulfate hemihydrate. This stucco may be employed in methods for preparing a gypsum board comprising mixing the stucco with water to make an aqueous gypsum slurry containing the calcium sulfate hemihydrate, and then depositing the aqueous gypsum slurry onto a gypsum board manufacturing line and allowing the deposited aqueous gypsum slurry to set to produce a core layer of the gypsum board.

The present method of recovering desalinated activated alumina (AA) beads from a composition comprising salt laden activated alumna (AA) beads and free anions and free cations is suitable for use, at the beginning of a method for making a gypsum board, to provide desalinated activated alumina (AA) beads for treating synthetic gypsum and other gypsum particles to reduce their high chloride salt concentrations to make the gypsum suitable for calcination to stucco suitable for gypsum wall board manufacture.

The present method of recovering desalinated activated alumina (AA) beads from a composition comprising salt laden activated alumina (AA) beads and free anions and free cations is also suitable for use in a method for making a gypsum board, to desalinate the salt laden activated alumna (AA) beads resulting from using activated alumna (AA) beads for treating synthetic gypsum and other gypsum particles to reduce their high chloride salt concentrations to make the gypsum suitable for calcination to stucco suitable for gypsum wall board manufacture. The resulting desalinated activated alumina (AA) beads may then be mixed with high salt gypsum to remove sufficient salt from the high salt gypsum to produce gypsum suitable for calcining to stucco for making additional gypsum boards. Or, the resulting desalinated activated alumina (AA) beads may be put to other uses or disposed of in an environmentally responsible manner.

In the manufacture of wallboard, stucco can be first mixed with dry additives such as perlite, starch, fiberglass, vermiculite or other additives known in the art. This dry mix can be combined with water, soap foam, accelerators and shredded paper, or pulpwood in a mixer at the head of a board forming line. The slurry is then spread between two paper sheets that serve as a mold. The edges of the paper can be scored, and sometimes chamfered, to allow precise folding of the paper to form the edges of the board. As the wet board travels the length of a conveying line, the calcium sulfate hemihydrate combines with the water in the slurry to form solid calcium sulfate dihydrate, or gypsum, resulting in rigid board. The board is typically rough-cut to length, and it typically enters a multideck kiln dryer, where it is dried. The dried board is typically conveyed to a board end sawing area and trimmed and bundled for shipment. In an embodiment, to produce gypsum board having front and back paper cover sheets, the stucco is mixed with water and additives to form an aqueous slurry which is continuously fed between continuous layers of paper on a board machine. As the board moves down a conveyer line to form a panel, the calcium sulfate recrystallizes or rehydrates, reverting to its original rock state. The paper becomes bonded to the core as the gypsum sets. The panel is then cut to length and conveyed through dryers to remove any free moisture.

The calcium sulfate hemihydrate is present in the deposited aqueous slurry in amounts of at least 60 wt. % of the dry (water-free) materials of the aqueous slurry. Preferably the calcium sulfate hemihydrate is at least 70 wt. % of the dry (water-free) materials of the aqueous slurry, more preferably at least 80 wt. % of the dry (water-free) materials of the aqueous slurry. In typical wallboard formulations of the invention the dry (water-free) materials of the aqueous slurry have at least 90 wt. % or at least 95 wt. % calcium sulfate hemihydrate. Use of calcium sulfate anhydrite is also contemplated, although it is preferably used in small amounts of less than 20 wt. % of the dry (water-free) materials of the aqueous slurry.

Typically, the aqueous gypsum slurry has less than 10 wt. %, more typically an absence, of Portland cement or other hydraulic cement on a dry (water-free) basis. Typically, the aqueous gypsum slurry has less than 10 wt. %, more typically an absence, of fly ash on a dry (water-free) basis. Typically, the aqueous gypsum slurry has less than 10 wt. %, more typically an absence, of calcium carbonate on a dry (water-free) basis. For purposes of this disclosure a dry basis is a water-free basis.

The typical gypsum boards comprise a board core layer comprising:
a board core layer comprising set gypsum;
a front paper cover sheet having an outer surface and an inner surface, the inner surface contacting a first face of the board core layer; and
a back paper cover sheet having an outer surface and an inner surface, the inner surface contacting a second face of the board core layer;
wherein the board core layer is disposed between the front paper cover sheet and the back paper cover sheet; and
wherein the board core layer resulted from setting an aqueous slurry comprising water and stucco between the first cover sheet and the second cover sheet, wherein the stucco comprises calcium sulfate hemihydrate, and the aqueous slurry comprises at least 60 weight percent said calcium sulfate hemihydrate on a dry (water free) basis, and the water at a weight ratio of water to the calcium sulfate hemihydrate of 0.2:1 to 1.2:1.

One or both of the cover sheets may be paper cover sheets, which may be the same or different paper materials. Optionally, various additives known in the art may be present in the board core layer or a gypsum slurry used to form the board core layer. The board core layer may further comprise one or more high-density regions (layers) in contact with the inner surface of the front cover sheet or the back cover sheet and coated thereon. The one or more high-density regions may be in contact with a low-density interior of the board core layer.

Typically, desired slurry thickness for the board core layer is substantially equal to the desired board thickness (e.g., about 0.375" (about 0.95 cm), about 0.5" (about 1.27 cm), about 0.625" (about 1.59 cm), about 0.75" (about 1.90 cm), or about 1" (about 2.54 cm). By way of illustration only, the final board thickness typically is within about + or -⅛" (about 0.32 cm) or less of the final slurry thickness.

Clauses of the Invention

The following clauses disclose various aspects of the invention.

Clause 1. A method of recovering desalinated activated alumina (AA) beads from a composition comprising salt laden activated alumna (AA) beads and free anions and free cations, wherein the salt of the salt laden activated alumna (AA) beads comprises a chloride salt, typically the salt comprises at least one of sodium chloride and potassium chloride, comprising:
electrodialysis of the composition to reduce chloride salt content of the activated alumina (AA) beads to produce a stream comprising the desalinated activated alumina (AA) beads,
wherein the activated alumina (AA) beads have a D50 median particle size of 0.5 mm to 5 mm, preferably 1 to 4 mm, or 2 to 4 mm.

Clause 2. The method of clause 1,
wherein the salt laden activated alumna (AA) beads may have greater than 500 ppm, greater than 5,000 ppm, greater than 10,000 ppm, or greater than 15,000 ppm by weight chloride anion on a dry basis; and
wherein the desalinated activated alumna (AA) beads may have less than 5,000 ppm, typically less than 3,000 ppm, more typically less than 1,000 ppm, furthermore typically less than 500 ppm, or less than 300 ppm by weight chloride anion on a dry basis.

Clause 3. The method of clause 1 or 2,
wherein the composition comprises a mixture of the salt laden activated alumina (AA) beads, liquid water and electrolyte, for example tetraethylammonium tetrafluoroborate, wherein the chloride salt forms the free anions and free cations in the water, wherein the cations comprise alkali metal ions and the anions comprise chloride ions and optionally potassium ions;
subjecting the mixture of activated alumina, liquid water, and electrolyte to the electrodialysis in an electrodialysis device by running an electric current through the mixture of activated alumina, liquid water, and electrolyte to remove the anions and the cations from the mixture to produce the desalinated activated alumina having reduced concentration of chloride salt absorbed on the activated alumina relative to concentration of chloride salt absorbed on the salt laden activated alumina prior to the electrodialysis, wherein the electrodialysis device comprises an anode and a cathode; and
separating the desalinated activated alumina beads from liquid of the mixture;
optionally repeating the process to reuse the liquid to extract chloride from an additional batch of salt laden activated alumina (AA) beads.

Clause 4. The method of clause 3, wherein the electrodialysis device comprises a diluate chamber and a concentrate chamber between the cathode and the anode;
wherein the salt laden activated alumina are placed in the diluate chamber, wherein the water and the electrolyte are placed in the diluate chamber and the concentrate chamber.

Clause 5. The method of clause 3, wherein the electrodialysis device comprises a diluate chamber containing the anode and a concentrate chamber containing the cathode;
wherein the chloride salt laden activated alumina beads are placed in the diluate chamber, wherein the water and the electrolyte are placed in the diluate chamber and the concentrate chamber.

Clause 6. The method of clause 3,
wherein anolyte comprising the salt laden activated alumina beads and water is added into the electrodialysis device;
wherein catholyte comprising the water is added into the electrodialysis device;

wherein the electrolyte, for example tetraethylammonium tetrafluoroborate, is added to the salt laden activated alumina beads and the water in the electrodialysis device.

Clause 7. The method of clause 6, wherein temperature in the anolyte is in a range from about 50 to about 100° C., suitably in the range from 55 to 90° C. and preferably in the range from 60 to 80° C.

Clause 8. The method of any of clauses 1 to 7, wherein the electrodialysis is done using an electrodialysis cell with a cation exchange membrane between an anode and a cathode.

Clause 9. The method of any of clauses 1 to 7, wherein the electrodialysis is done using an electrodialysis cell without a cation exchange membrane between an anode and a cathode.

Clause 10. The method of any of clauses 3 to 7, wherein the electrodialysis device comprises at least one electrodialysis cell configured so that a cation exchange membrane separates at least one anolyte product region, containing the desalinated activated alumina beads, from a catholyte region.

Clause 11. The method of any of clauses 1 to 10, wherein the activated alumina beads have a volume mean diameter, or a mean length (largest dimension when it is not spherical), of particle size of 0.5 mm to 5 mm, preferably 1-4 or more preferably 2-4 mm.

Clause 12. The method of any of clauses 1 to 11, wherein the electrodialysis is performed at a current density in the range from about 1 to about 10 kA/m$^2$, suitably in the range from 1.5 to 6 kA/m$^2$.

Clause 13. The method of any of clauses 3 to 12, wherein material of the cathode may be steel or nickel, suitably nickel, graphite, titanium, coated titanium or activated nickel.

Clause 14. The method of any of clauses 3 to 13, wherein material of the anode may be lead, graphite, titanium, coated titanium, lead oxides, tin oxide, tantalum or titanium, or combinations thereof.

Clause 15. The method of any of clauses 1 to 14, wherein the chloride salt laden activated alumina beads are pre-wetted before the electrodialysis in water, before being added to the electrodialysis device.

Clause 16. The method of clause 3, wherein the alkali metal ions are collected as an alkali metal hydroxide-containing aqueous catholyte, and wherein the chloride ions form hydrochloric acid and/or chlorine gas.

Clause 17. The method of clause 1, wherein the electrodialysis is initially conducted at a pH of from about 1 to 7 and the electrodialysis is finally conducted at a pH of from about 5 to 12.5, for example 6.5 to 10.5.

Clause 18 The method of clause 3, wherein the electrodialysis device comprises:
an anode compartment,
a compartment containing a stack of ion exchange membranes, and
a cathode compartment.

Clause 19. The method of clause 3, wherein the electrodialysis device comprises an electrodialysis stack, wherein the electrodialysis stack comprises:
the anode and the cathode;
a plurality of ion exchange membrane pairs disposed between the pair of electrodes, wherein each ion exchange membrane pair comprises a cation exchange membrane (CEM) and an anion exchange membrane (AEM), wherein the plurality of membrane pairs are placed parallel to one another within the device such that the AEMs and the CEMs alternate;
a plurality of diluate channels, wherein each diluate channel is formed between the CEM and the AEM of each ion exchange membrane pair, and wherein each diluate channel comprises a diluate channel inlet and a diluate channel outlet; and
a plurality of concentrate channels, wherein each concentrate channel is formed between the AEM of one ion exchange membrane pair and the CEM of the adjacent ion exchange membrane pair, wherein each concentrate channel has a concentrate channel inlet and a concentrate channel outlet.

Clause 20. A method for making a gypsum board comprising:
recovering desalinated activated alumina (AA) beads from a composition comprising the salt laden activated alumna (AA) beads and free anions and free cations by the method of any of clauses 1 to 19; and
treating a salt-containing gypsum source comprising salt-containing gypsum powder particles with the desalinated activated alumina (AA) beads, said treating comprising:
mixing the desalinated activated alumina (AA) beads, which have an absence of moisture or up to 30% free moisture, typically 5-30 wt. % free moisture, preferably 10%-20% free moisture, with the salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the chloride salt absorbing beads to the salt-containing gypsum powder particles in a range 5 to 50 parts by weight beads to 100 parts by weight salt-containing gypsum powder particles on a moisture inclusive basis, to transfer chloride salt from the salt-containing gypsum powder particles to the desalinated activated alumina (AA) beads to produce a mixture of salt laden activated alumina (AA) beads and treated gypsum powder particles, wherein the salt laden activated alumina (AA) beads are all larger in particle size than the treated gypsum powder particles;
wherein the salt-containing gypsum powder particles comprise at least 80 wt. %, preferably at least 90 wt. %, calcium sulfate dihydrate on a dry basis,
wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis,
wherein the salt-containing gypsum powder particles have a D50 median particle size of 10 to 100 microns, preferably D50 median particle size of 30 to 50 microns,
wherein the desalinated activated alumina (AA) beads have a D50 median particle size of 0.5 mm to 5 mm, preferably 1 to 4 mm or 2 to 4 mm, and
after said mixing of the desalinated activated alumina (AA) beads with the salt-containing gypsum powder particles, drying the mixture of the salt laden activated alumina (AA) beads and the treated gypsum powder particles and separating the treated gypsum powder particles from the salt laden activated alumina (AA) beads to recover the treated gypsum powder particles and recover the salt laden activated alumina (AA) beads;

calcining the recovered treated gypsum powder particles to make stucco comprising calcium sulfate hemihydrate;

mixing the stucco with water to form an aqueous gypsum slurry comprising the calcium sulfate hemihydrate;

depositing the aqueous gypsum slurry on a surface to form a layer of the aqueous gypsum slurry;

allowing the deposited layer of the aqueous gypsum slurry to set to form a layer comprising set gypsum;

cutting and drying the layer comprising set gypsum to make the gypsum board comprising the set gypsum as a core layer.

Clause 21. A gypsum board made by the method of clause 20.

Clause 22. A method for making a gypsum board comprising:

treating a salt-containing gypsum source comprising salt-containing gypsum powder particles with salt absorbing activated alumina (AA) beads, said treating comprising:

mixing the salt absorbing activated alumina (AA) beads, which have an absence of moisture or up to 30% free moisture, typically 5-30 wt. % free moisture, preferably 10% -20% free moisture, with the salt-containing gypsum powder particles, which contain 5-30 wt. % of free moisture, typically 10 wt. % to 20 wt. % free moisture, preferably 15 wt. % to 20 wt. % free moisture, for a time in a range of 5 minutes to 5 hours, preferably 30 minutes to 2 hours, at a mix ratio of the salt absorbing activated alumina (AA) beads to the salt-containing gypsum powder particles in a range 5 to 50 parts by weight beads to 100 parts by weight salt-containing gypsum powder particles on a moisture inclusive basis, to transfer chloride salt from the salt-containing gypsum powder particles to the salt absorbing activated alumina (AA) beads to produce a mixture of salt laden activated alumina (AA) beads and treated gypsum powder particles, wherein the salt laden activated alumina (AA) beads are all larger in particle size than the treated gypsum powder particles;

wherein the salt-containing gypsum powder particles comprise at least 80 wt. %%, preferably at least 90 wt. %, calcium sulfate dihydrate on a dry basis, wherein the salt-containing gypsum powder particles comprise greater than 300 parts by weight chloride anion, typically about 500 parts by weight to about 3000 parts by weight chloride anion, per 1,000,000 parts by weight said salt-containing gypsum powder particles on a dry basis, wherein the salt-containing gypsum powder particles have a D50 median particle size of 10 to 100 microns, preferably D50 median particle size of 30 to 50 microns, wherein the salt absorbing activated alumina (AA) beads have a D50 median particle size of 0.5 mm to 5 mm, preferably 1 to 4 mm or 2 to 4 mm, and after said mixing of the salt absorbing activated alumina (AA) beads with the salt-containing gypsum powder particles, drying the mixture of the salt laden activated alumina (AA) beads and the treated gypsum powder particles and separating the treated gypsum powder particles from the salt laden activated alumina (AA) beads to recover the treated gypsum powder particles and recover the salt laden activated alumina (AA) beads;

calcining the recovered treated gypsum powder particles to make stucco comprising calcium sulfate hemihydrate;

mixing the stucco with water to form an aqueous gypsum slurry comprising the calcium sulfate hemihydrate;

depositing the aqueous gypsum slurry on a surface to form a layer of aqueous gypsum slurry;

allowing the layer of aqueous gypsum slurry to set to form a layer comprising set gypsum;

cutting and drying the layer comprising set gypsum to make the gypsum board comprising the set gypsum as a core layer; and recovering desalinated activated alumina (AA) beads from a composition comprising the salt laden activated alumna (AA) beads and free anions and free cations by the method of any of clauses 1 to 19.

Clause 23. A gypsum board made by the method of clause 22.

EXAMPLES

For preparation of high salt absorbed AA beads, 200 grams of the high salt absorbed AA beads were prepared by following the method U.S. patent application Ser. No. 17/643,523, filed Dec. 9, 2021. XRF measured the chloride concentration in the beads. The chloride concentration used in this invention example is 0.835% (8350 ppm).

All of the beads were dried at 350° F. for 4 hours prior applying salt to the beads by contact with High-Salt Syngyp powder. Pre-wetting to make "Wet" beads can be done by keeping the beads in a humidified condition, such as in a 90° F. and 90% relative humidity (RH) room, or directly spraying water on them.

In all the examples, As-received High-Salt Syngyp powder (which may also be termed "As-is High-Salt Syngyp") contains 11.5 wt. % of free moisture. It can be directly mixed with the beads, or a small amount of extra water is added to increase its free moisture percentage before mixing with the beads.

The weight ratio of the beads and the High-salt Syngyp powder is between 10% and 30%, and the mixing time is between 5 and 30 minutes. The gyroscopic mixing simultaneously spins containers which contain the high-salt Syngyp particles and the beads vertically and horizontally to accomplish the mixing.

The mixtures of beads and the High-salt Syngyp powder are dried at 110° F. overnight, then the beads and the Syngyp powder are separated by using No. 20 Mesh sieve.

Chloride test strips (available from HACH Company, Loveland, Colorado) are used to measure chloride levels before and after the absorption treatment.

Figure 5:
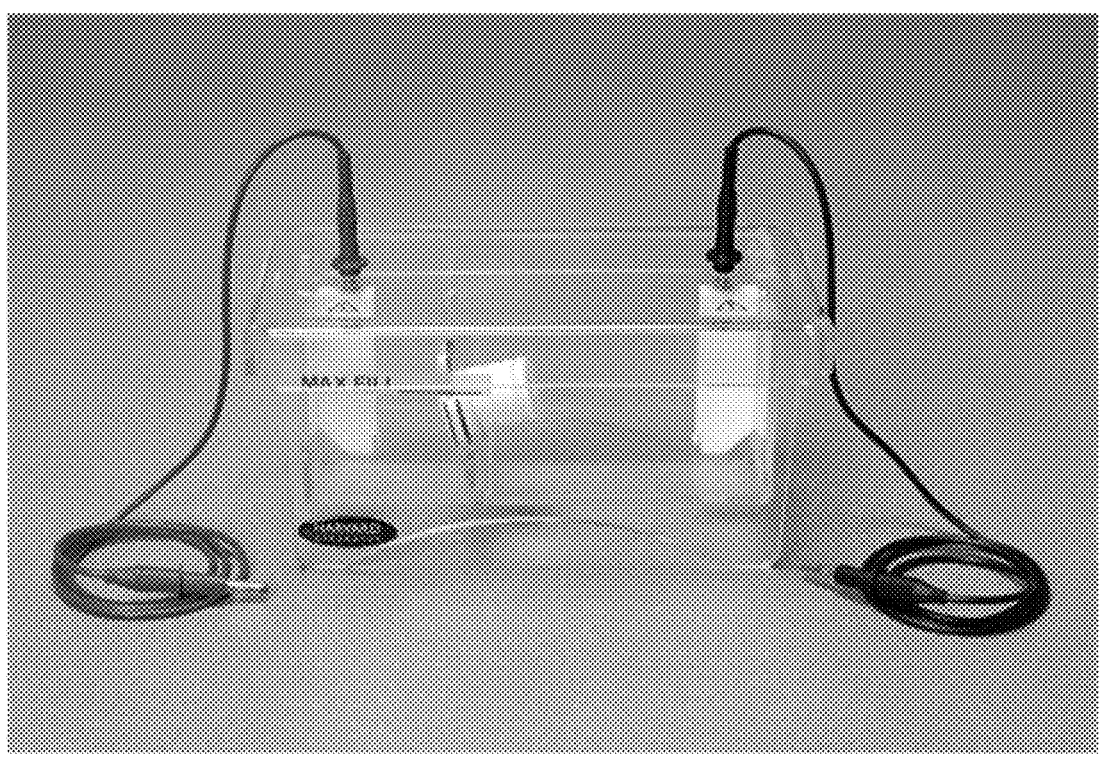
FIG. 5 shows a Harvard Electrodialysis System.

The electrodialysis process employed as the apparatus a Harvard Electro dialysis System that looked like the device shown in FIG. 5 but without a membrane between the cathodic chamber and anodic chamber.

In the process, high salt absorbed AA beads and water were added into the dialysis tank. In some of the experiments, the beads were pre-wetted by spraying with water onto the beads and shaking the beads with water on the shaker (60 rpm) for 5 minutes.

The electric current used in electrodialysis process was 100 mA. Electrolyte, such as tetraethylammonium tetrafluoroborate (TEABF4), was added in some of the experiments. Agitation of the beads was applied in some of the experiments. The total electrodialysis process was 20 minutes.

To perform chloride measurement, after the electrodialysis process, the beads were dried and ground into the powder. XRF was used to measure the chloride concentration in the beads.

Results

1) Effect of Pre-Wetting and Electrodialysis Treatment

TABLE 1 shows the effect of pre-wetting and electrodialysis (ED) treatment on chloride extraction from as-is high salt AA beads: 8350 ppm.

TABLE 1

Effect of Pre-wetting and Electrodialysis treatment on chloride extraction. As-is high salt AA beads: 8350 ppm Cl⁻ anion per 1,000,000 parts by weight of salt laden beads

| Sample ID | High Salt AA beads (g) | Pre-wetting H2O (g) | Pre-wetting time (min) | H2O in tank (g) | Soaking time (min) | ED current (mA) | Cl left in beads (ppm) | Cl extraction (%) |
|---|---|---|---|---|---|---|---|---|
| #1 | 10 | 0 | 0 | 210 | 25 | 0 | 4990 | 40.2 |
| #2 | 10 | 10 | 5 | 200 | 20 | 0 | 4740 | 43.2 |
| #3 | 10 | 0 | 0 | 210 | 20 | 100 | 1710 | 79.5 |
| #4 | 10 | 10 | 5 | 200 | 20 | 100 | 1510 | 81.9 |

TABLE 1 shows that if the high salt AA beads is simply soaked in the water for 20 minutes, the chloride extraction is 40.2%. However, if the activated alumina (AA) beads are pre-wetted with a small amount of water for 5 mins and then added in the rest of the water, the chloride extraction increases from 40.2% to 43.2%. When the electrodialysis process is applied, the chloride extraction significantly increases from 40.2% to 79.5%. When pre-wetting procedure is applied, the chloride extraction further increases from 79.5% to 81.9%. Therefore, Both Pre-wetting and electrodialysis process are beneficial for the desalination of AA beads.

2) Reuse of Water

Table 2 shows the effect of used water on the chloride extraction. After the $1^{st}$ electrodialysis process (Sample #5), the beads were removed and the liquid was reused to keep extracting the chloride from the high salt AA beads for two more times (Sample #6 and #7). TABLE 2 shows that the reused water still reduces the chloride effectively. The chloride extraction from Sample #7 is 56.8% in the $3^{rd}$ electrodialysis process, higher than 43.2% in Sample #2 of TABLE 1 without the electrodialysis process.

TABLE 2

Effect of water reuse on chloride extraction. As-is high salt AA beads: 8350 ppm

| Sample ID | High Salt AA beads (g) | Pre-wetting H2O (g) | Pre-wetting time (min) | H2O in tank (g) | Soaking time (min) | ED current (mA) | Cl left in beads (ppm) | Cl extraction (%) |
|---|---|---|---|---|---|---|---|---|
| #5 | 10 | 0 | 0 | 210 | 20 | 100 | 1690 | 79.8 |
| #6 | 10 | 0 | 0 | #5 liquid | 20 | 100 | 2790 | 66.6 |
| #7 | 10 | 0 | 0 | #6 liquid | 20 | 100 | 3610 | 56.8 |

3) Electrolyte-Tetraethylammonium tetrafluoroborate (TEABF4)

1.5 grams of TEABF4 solid is added to 200 grams of water. TABLE 3 shows the effect of TEABF4 on chloride extraction. It is shown that the addition of TEABF4 significantly improves the chloride extraction from 78.7% (Sample #8) to 86.1% (Sample #9). Therefore, TEABF4 electrolyte is beneficial in the electrodialysis process.

TABLE 3

Effect of TEABF4 reuse on chloride extraction. As-is high salt AA beads: 8350 ppm

| Sample ID | High Salt AA beads (g) | Pre-wetting H2O (g) | Pre-wetting time (min) | H2O in tank (g) | TEABF4 (g) | Soaking time (min) | ED current (mA) | Cl left in beads (ppm) | Cl extraction (%) |
|---|---|---|---|---|---|---|---|---|---|
| #8 | 10 | 10 | 5 | 190 | 0 | 20 | 100 | 1780 | 78.7 |
| #9 | 10 | 10 | 5 | 190 | 1.5 | 20 | 100 | 1160 | 86.1 |

4) Agitation of AA Bead

TABLE 4 shows the effect of agitation on the chloride extraction. Agitation was performed by putting a stirrer under the tank and put a stirring bar in the chamber. This shows that agitation increases the chloride extraction from 86.1% to 90.8%. Therefore, agitation is beneficial in the electrodialysis process.

TABLE 4

Effect of agitation on chloride extraction. As-is high salt AA beads: 8350 ppm

| Sample ID | High Salt AA beads (g) | Pre-wetting H2O (g) | Pre-wetting time (min) | H$_2$O in tank (g) | TEABF4 (g) | Soaking time (min) | Agitation of Beads (rpm) | ED current (mA) | Cl (ppm) | Cl extraction (%) |
|---|---|---|---|---|---|---|---|---|---|---|
| #9 | 10 | 10 | 5 | 190 | 1.5 | 20 | 0 | 100 | 1160 | 86.1 |
| #10 | 10 | 10 | 5 | 190 | 1.5 | 20 | 100 | 100 | 770 | 90.8 |

In summary, if the AA beads are only soaked in the water, the chloride concentration of AA beads only reduces from 8350 ppm to 4740 ppm in 25 minutes. However, by using an optimized electrodialysis process the invention is able to significantly reduce the chloride concentration in AA beads from 8350 ppm to 770 ppm, namely, 90.8% of chloride is removed from the AA beads.

The above data shows the following:
The electrodialysis (ED) process is a rapid and effective method to extract the chloride salts from the high salt absorbed porous AA beads.
Water in the electrodialysis process can be reused.
Electrolyte, such as Tetraethylammonium tetrafluoroborate, is optional.
Pre-wetting AA beads is optional.
Agitation of the AA beads is optional.

We claim:

1. A method of recovering desalinated activated alumina (AA) beads from a composition comprising salt laden activated alumna (AA) beads and free anions and free cations, wherein the salt of the salt laden activated alumna (AA) beads comprises a chloride salt, comprising:
   electrodialysis of the composition to reduce chloride salt content of the activated alumina (AA) beads to produce a stream comprising the desalinated activated alumina (AA) beads,
   wherein the activated alumina (AA) beads have a D50 median particle size of 0.5 mm to 5 mm,
   wherein the composition comprises a mixture of the salt laden activated alumina (AA) beads, liquid water and electrolyte, wherein the chloride salt forms the free anions and free cations in the water, wherein the cations comprise alkali metal ions and the anions comprise chloride ions and optionally potassium ions;
   subjecting the mixture of activated alumina, liquid water, and electrolyte to the electrodialysis in an electrodialysis device by running an electric current through the mixture of activated alumina, liquid water, and electrolyte to remove the anions and the cations from the mixture to produce the desalinated activated alumina having reduced concentration of chloride salt absorbed on the activated alumina relative to concentration of chloride salt absorbed on the salt laden activated alumina prior to the electrodialysis, wherein the electrodialysis device comprises an anode and a cathode; and
   separating the desalinated activated alumina beads from liquid of the mixture;
   optionally repeating the process to reuse the liquid to extract chloride from an additional batch of salt laden activated alumina (AA) beads,
   wherein the electrodialysis device comprises one or more of the group consisting of
   a) at least one electrodialysis cell configured so that a cation exchange membrane separates at least one anolyte product region, containing the desalinated activated alumina beads, from a catholyte region,
   b) a diluate chamber and a concentrate chamber between the cathode and the anode, and
   c) a diluate chamber containing the anode and a concentrate chamber containing the cathode; and
   separating the desalinated activated alumina beads from liquid of the mixture;
   optionally repeating the process to reuse the liquid to extract chloride from an additional batch of salt laden activated alumina (AA) beads.

2. The method of claim 1,
   wherein the salt laden activated alumina (AA) beads may have greater than 5,000 ppm by weight chloride anion on a dry basis; and
   wherein the desalinated activated alumina (AA) beads may have less than 5,000 ppm by weight chloride anion on a dry basis.

3. The method of claim 1 wherein the electrodialysis device comprises a diluate chamber and a concentrate chamber between the cathode and the anode; and
wherein the salt laden activated alumina are placed in the diluate chamber,
wherein the water and the electrolyte are placed in the diluate chamber and the concentrate chamber.

4. The method of claim 1 wherein the electrodialysis device comprises a diluate chamber containing the anode and a concentrate chamber containing the cathode; and
wherein the chloride salt laden activated alumina beads are placed in the diluate chamber, wherein the water and the electrolyte are placed in the diluate chamber and the concentrate chamber.

5. The method of claim 1, wherein the electrodialysis is done using an electrodialysis cell without a cation exchange membrane between an anode and a cathode.

6. The method of claim 1
wherein the electrodialysis device comprises at least one electrodialysis cell configured so that a cation exchange membrane separates at least one anolyte product region, containing the desalinated activated alumina beads, from a catholyte region.

7. The method of claim 1, wherein the activated alumina beads have a volume mean diameter, or a mean length, of particle size of 0.5 mm to 5 mm.

8. The method of claim 1, wherein the electrodialysis is performed at a current density in the range from about 1 to about 10 kA/m$^2$.

9. The method of claim 1, wherein material of the cathode is steel, nickel, graphite, titanium, coated titanium or activated nickel.

10. The method of claim 1, wherein material of the anode is lead, graphite, coated titanium, lead oxides, tin oxide, tantalum, or combinations thereof.

11. The method of claim 1, wherein the chloride salt laden activated alumina beads are pre-wetted before the electrodialysis in water, before being added to the electrodialysis device.

12. The method of claim 1, wherein the alkali metal ions are collected as an alkali metal hydroxide-containing aqueous catholyte, and wherein the chloride ions form hydrochloric acid and/or chlorine gas.

13. A method of recovering desalinated activated alumina (AA) beads from a composition comprising salt laden activated alumna (AA) beads and free anions and free cations, wherein the salt of the salt laden activated alumna (AA) beads comprises a chloride salt, comprising:
electrodialysis of the composition to reduce chloride salt content of the activated alumina (AA) beads to produce a stream comprising the desalinated activated alumina (AA) beads,
wherein the activated alumina (AA) beads have a D50 median particle size of 0.5 mm to 5 mm,
wherein the composition comprises a mixture of the salt laden activated alumina (AA) beads, liquid water and electrolyte, wherein the chloride salt forms the free anions and free cations in the water, wherein the cations comprise alkali metal ions and the anions comprise chloride ions and optionally potassium ions;
subjecting the mixture of activated alumina, liquid water, and electrolyte to the electrodialysis in an electrodialysis device by running an electric current through the mixture of activated alumina, liquid water, and electrolyte to remove the anions and the cations from the mixture to produce the desalinated activated alumina having reduced concentration of chloride salt absorbed on the activated alumina relative to concentration of chloride salt absorbed on the salt laden activated alumina prior to the electrodialysis, wherein the electrodialysis device comprises an anode and a cathode;
wherein anolyte comprising the salt laden activated alumina beads and water is added into the electrodialysis device;
wherein catholyte comprising the water is added into the electrodialysis device;
wherein the electrolyte comprises tetraethylammonium tetrafluoroborate, and wherein the electrolyte is added to the salt laden activated alumina beads and the water in the electrodialysis device, and
separating the desalinated activated alumina beads from liquid of the mixture;
optionally repeating the process to reuse the liquid to extract chloride from an additional batch of salt laden activated alumina (AA) beads.

14. The method of claim 13, wherein temperature in the anolyte is in a range from about 50 to about 100° C.

15. A method of recovering desalinated activated alumina (AA) beads from a composition comprising salt laden activated alumna (AA) beads and free anions and free cations, wherein the salt of the salt laden activated alumna (AA) beads comprises a chloride salt, comprising:
electrodialysis of the composition to reduce chloride salt content of the activated alumina (AA) beads to produce a stream comprising the desalinated activated alumina (AA) beads,
wherein the activated alumina (AA) beads have a D50 median particle size of 0.5 mm to 5 mm, wherein the electrodialysis is done using an electrodialysis cell with a cation exchange membrane between an anode and a cathode.

16. A method for making a gypsum board comprising:
recovering desalinated activated alumina (AA) beads from a composition comprising the salt laden activated alumna (AA) beads and free anions and free cations by the method of recovering desalinated activated alumina (AA) beads from a composition comprising salt laden activated alumna (AA) beads and free anions and free cations, wherein the salt of the salt laden activated alumna (AA) beads comprises a chloride salt, comprising:
electrodialysis of the composition to reduce chloride salt content of the activated alumina (AA) beads to produce a stream comprising the desalinated activated alumina (AA) beads,
wherein the activated alumina (AA) beads have a D50 median particle size of 0.5 mm to 5 mm; and
treating a salt-containing gypsum source comprising salt-containing gypsum powder particles with the activated alumina (AA) beads, wherein the activated alumina (AA) beads comprise one or more of the group consisting of desalinated activated alumina (AA) beads and salt absorbing activated alumina (AA) beads, said treating comprising:
mixing the activated alumina (AA) beads, which have an absence of moisture or up to 30% free moisture, with the salt-containing gypsum powder particles, which contain 5-30 wt. % of free moisture, for a time in a range of 5 minutes to 5 hours,
at a mix ratio of the chloride salt absorbing beads to the salt-containing gypsum powder particles in a range 5 to 50 parts by weight beads to 100 parts by weight salt-containing gypsum powder particles on a moisture inclusive basis, to transfer chloride salt from the salt-containing gypsum powder particles to the activated alumina (AA) beads to produce a mixture of salt laden activated alumina (AA) beads and treated gypsum powder particles, wherein the salt laden activated alumina (AA) beads are all larger in particle size than the treated gypsum powder particles;

wherein the salt-containing gypsum powder particles comprise at least 80 wt. % calcium sulfate dihydrate on a dry basis, wherein the salt-containing gypsum powder particles comprise greater than 300 parts by weight chloride anion per 1,000,000 parts by weight said salt-containing gypsum powder particles on a dry basis, wherein the salt-containing gypsum powder particles have a D50 median particle size of 10 to 100 microns, wherein the activated alumina (AA) beads have a D50 median particle size of 0.5 mm to 5 mm, and after said mixing of the activated alumina (AA) beads with the salt-containing gypsum powder particles, drying the mixture of the salt laden activated alumina (AA) beads and the treated gypsum powder particles and separating the treated gypsum powder particles from the salt laden activated alumina (AA) beads to recover the treated gypsum powder particles and recover the salt laden activated alumina (AA) beads;

calcining the recovered treated gypsum powder particles to make stucco comprising calcium sulfate hemihydrate;

mixing the stucco with water to form an aqueous gypsum slurry comprising the calcium sulfate hemihydrate;

depositing the aqueous gypsum slurry on a surface to form a layer of the aqueous gypsum slurry;

allowing the deposited layer of the aqueous gypsum slurry to set to form a layer comprising set gypsum;

cutting and drying the layer comprising set gypsum to make the gypsum board comprising the set gypsum as a core layer.

17. The method of claim 16, wherein the activated alumina (AA) beads comprise desalinated activated alumina beads.

18. The method of claim 16, wherein the activated alumina (AA) beads comprise salt absorbing activated alumina (AA) beads.

\* \* \* \* \*